United States Patent

Frauenfelder et al.

[15] 3,653,061

[45] Mar. 28, 1972

[54] DIGITAL DATA WRITE DESKEWING MEANS

[72] Inventors: Lewis S. Frauenfelder; Judson A. McDowell, both of Boulder, Colo.

[73] Assignee: International Business Machines Corporation, Armonk, N.Y.

[22] Filed: July 20, 1970

[21] Appl. No.: 57,382

[52] U.S. Cl.................346/74 M, 340/174.1 B, 340/174.1 G
[51] Int. Cl....................G11b 5/06, G11b 5/44, G11b 23/18
[58] Field of Search...........346/74 M; 340/174.1 G, 174.1 B; 307/208; 328/58, 63

[56] References Cited

UNITED STATES PATENTS 3,504,288 3/1970 Ross .......................................328/63
3,263,223 7/1966 Zenzefilis.......................340/174.1 B

*Primary Examiner*—Howard W. Britton
*Attorney*—Hanifin and Jancin and Francis A. Sirr

[57] ABSTRACT

An electrical circuit is adapted to receive a plurality of data signals having time coincidence relationship, and is constructed and arranged to produce, as an output, a plurality of similar data signals arranged out of time coincidence in a predetermined manner in accordance with the gap scatter pattern of an associated multiple gap magnetic transducer; the electrical circuit including a plurality of individual circuits, each of which includes a commutating gate, a monostable device having a timing interval which is shorter than the shortest period between transition of the data signal, and a bistable device connected to the output of the monostable device and responsive only to the trailing edge of its output pulse, the output of the bistable device being connected to control the commutating gate and also constituting a time delayed output data signal.

9 Claims, 6 Drawing Figures

INVENTORS

LEWIS S. FRAUENFELDER
JUDSON A. MC DOWELL

BY

[signature]

ATTORNEY

DIGITAL DATA WRITE DESKEWING MEANS

BACKGROUND AND SUMMARY OF THE INVENTION

The present invention finds particular utility in the field of the magnetic recording of multitrack digital data on a moving medium, as this medium moves in relation to a multi-gap magnetic transducer or head. Such recording may take the form of a stationary head supported in relation to a moving web or strip of magnetic recording tape, to record a plurality of transversely spaced tracks of digital data, for example, seven or nine. A single character of data may comprise a transverse pattern of 0's or 1's selectively recorded in each track of the tape. Such a character, called a byte, has a bit, the 0 or 1, recorded in each track, and has a known character cell width, within a data block, each character cell is followed by another character cell.

The prior art teaches the concept of mechanical adjusting the head position to minimize the skew of a data character as it is recorded, or written, on the tape. Also, prior art devices utilize static delay elements, such as delay lines, delay multivibrators or other electrical delay elements, to selectively delay each of the track signals, either when reading or writing, in order to minimize the effects of mechanical head gap scatter. Static delay elements are to be distinguished from dynamic delay elements which are utilized in the prior art to compensate for dynamic tape skew as it moves past the head.

The present invention is an improvement relating to the use of static delay elements to produce a plurality of data signals which are selectively delayed in accordance with the known head gap scatter pattern of a multi-gap head, such that data is written on the moving tape in time coincidence.

Specifically, the present invention utilizes a plurality of delay elements, each of which includes a commutating gate energizing a monostable device, the monostable device energizing a bistable device, and the bistable device both energizing a gap of the head and providing a control input to the commutating gate.

More specifically, the commutating gate is adapted to receive non-return-to-zero (NRZ) data and, as controlled by the bistable device, provides a given polarity output for each transition of the data, be it a negative-going or a positive-going transition. The monostable device may be a multivibrator which is responsive only to the given polarity output of the commutating gate. A critical feature of the present invention is that the timing period of the multivibrator must be less than the shortest time interval between transition of the data. For example, with NRZ data, the shortest time interval which can occur between transitions of the data signal is when a "0" or a "1" is followed by a "1" or a "0," respectively, and is equal to a cell width. The trailing edge of each output pulse of the multivibrator sets the bistable device to its alternate state, the bistable device providing a memory function to maintain a given output signal level until the next output pulse of the multivibrator occurs.

The foregoing and other objects, features, and advantages of the invention will be apparent from the following more particular description of the preferred embodiments of the invention, as illustrated in the accompanying drawings.

DETAILED DESCRIPTION OF THE PREFERRED EMBODIMENT

Figure 1:
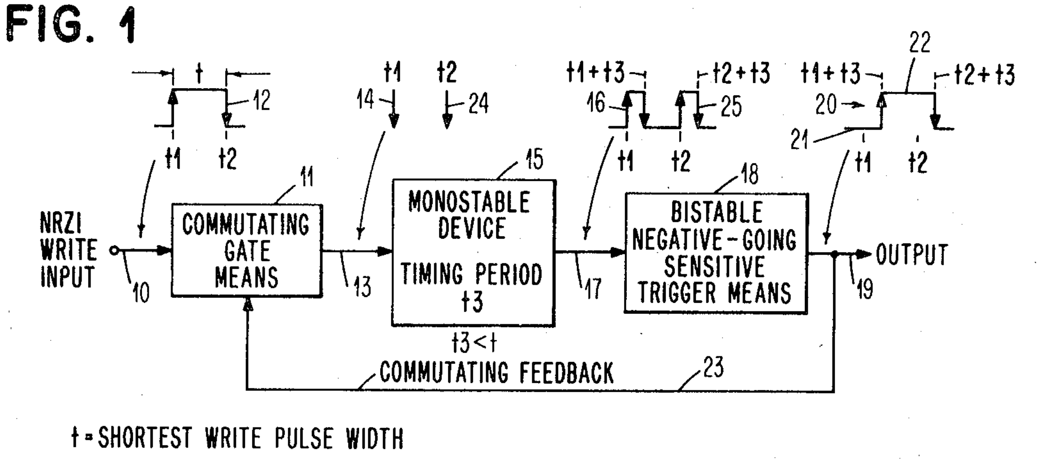
FIG. 1 is a block diagram showing an embodiment of the present invention.

Considering FIG. 1, the NRZI write input data is connected to input conductor 10 and forms one input to commutating gate means 11. The form of the signal on conductor 10 has been represented, as an example, by waveform 12 wherein the leading positive-going transition represents the occurrence of a digital "1," and a time period thereafter the negative-going transition 12 represents the occurrence of a second "1." The first transition occurs at the time $t1$, the second transition occurs at the time $t2$, and the time interval between these transitions, $t$, is the shortest write pulse width interval, equal to one cell width.

It will be assumed that commutating gate means 11 is in a condition to pass the positive-going transition, which occurs at time $t1$, to its output conductor 13 as a negative-going transition 14, which likewise occurs at time t1. Monostable device 15 is constructed and arranged to be responsive only to a negative-going transition on input conductor 13. Thus, in response to transition 14, monostable device 15 operates to produce output pulse 16. The timing period of monostable device 15 is equal to timing interval t3. A critical feature of the present invention is that the timing interval $t3$ be less than the shortest write pulse width, $t$, which may exist in the NRZI write input data present on conductor 10. As will be apparent from the following discussion, timing period $t\,3$ is variable and is statically adjusted in accordance with the gap scatter pattern of an associated magnetic transducing head.

Referring again to the output of monostable device 15, output pulse 16 has a time duration $t3$. The leading positive-going edge of this pulse occurs at time $t1$, and the trailing negative-going edge of this pulse occurs at time $t1 + t3$. Signal 16 is applied as an input to bistable, negative-going sensitive trigger means 18. Trigger means 18 is constructed and arranged to be responsive only to the negative going trailing edge of pulse 16, and in response thereto, trigger means changes from one of its stable states to the other. The output of trigger means 18 appears on conductor 19 and, for the example being explained, the waveform to be provided on conductor 19 is represented as waveform 20. At time $t1$, the output on conductor 19 is represented by level 21. A short time thereafter, at time $t1 + t3$, the output of trigger means 18 assumes its other stable state, represented by portion 22 of curve 20. Thus, the positive-going transition of the NRZI write input data which occurred at time $t1$, has been delayed to the time $t1 + t3$. Furthermore, trigger means 18 remains in its stable state to provide a memory level represented by portion 22 of curve 20.

The output of trigger means 18 is also applied to conductor 23 as a commutating feedback to the second input of commutating gate means 11. The function of commutating feedback 23 is to condition commutating gate means 11 to accept the next transition of the NRZI write input data, which occurs at time $t2$, and to cause this negative-going transition to appear as a negative-going transition at conductor 13. Monostable device 15 then responds to the negative-going output 24 of commutating gate 11 to produce a second operation of monostable device 15, to generate pulse 25. The negative-going trailing edge of pulse 25 occurs at time $t2 + t3$. Trigger means 18 responds to the negative-going transition of pulse 25 to switch from its stable condition of operation 22 to its stable condition of operation 21, the transition from condition 22 to 21 occurring at time $t2 + t3$.

Thus, the structure of FIG. 1 reproduces the NRZI write input data on conductor 10 as waveform 20, wherein the transitions which occurred at times $t1$ and $t2$ have been delayed by the timing period of monostable device 15, this timing period being the interval $t3$.

The structure of the present invention accommodates all patterns of NRZI data which may be applied to input conductor 10. Trigger means 18 maintains a memory between transitions of this input data, regardless of the number of "0's" or "1's" which may be written, one following the other. Monostable device 15 responds to each transition of the NRZI input data and delays the transition by the timing period of the monostable device. Commutating gate means 11 is controlled by trigger means 18 so as to accept all transitions of the NRZI write input data, these transitions being alternately negative-going and positive-going, and to cause these transitions to appear as a like polarity transition at the input of monostable device 15.

Figure 6:
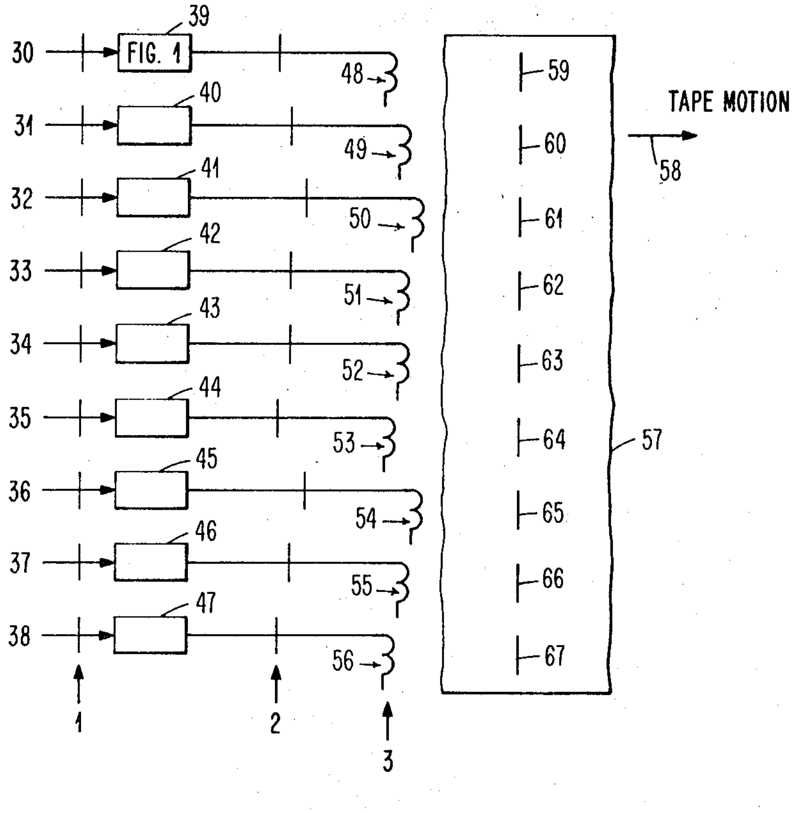
FIG. 6 is a diagrammatic showing of a nine track recording system, utilizing nine of the structures shown in FIG. 1 or 2, and the relationship of the nine data signals at points 1, 2 and 3.

Referring to FIG. 6, this figure is a diagrammatic showing of a nine track recording system wherein each of the data tracks 30–38 includes a delay structure 39–47 of the type disclosed in FIG. 1. The output of each delay structure energizes the coils of individual write heads 48–56 associated with a single magnetic transducing head. Reference numeral 57 identifies a portion of the tape which is moving in the direction indicated by arrow 58 under heads 48–56 to record the data, represented by "1's" 59–67, the transverse alignment to define one character or byte of data.

FIG. 6 also shows the relationship of the nine data signals at points 1, 2 and 3. The data at point 1 is in time coincidence as it is received from a data source (not shown). Each "1" bit of data passes through its respective time delay and appears at point 2 in a pattern out of time coincidence, in accordance with the known gap scatter pattern at heads 48–56, as shown at point 3. The out of time coincidence of the signals at point 2, when combined with the gap scatter pattern at point 3, produce the position coincident recording shown on tape 57. Thus, the use of the structure of FIG. 1 in each of the nine data paths 30–38 has eliminated the scattering of the data recorded on tape 57. As has been mentioned, each of the structures 39–47 is individually adjusted to produce the out of time coincidence pattern at point 2, as shown in FIG. 6.

Figure 2:
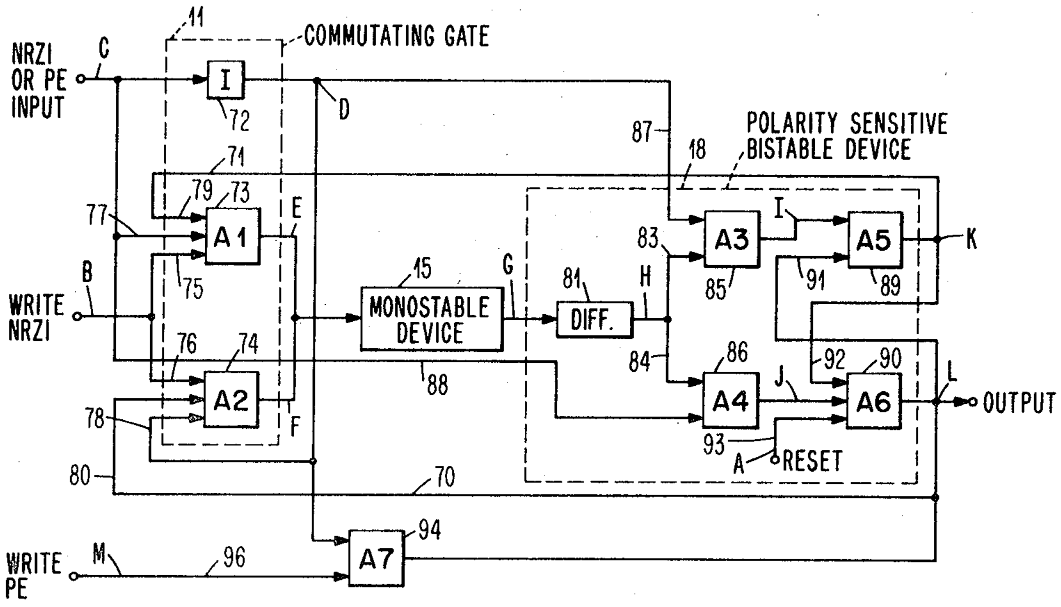
FIG. 2 is a showing of a specific structure to be utilized in FIG. 1.

A specific structure to be utilized in the structure in FIG. 1 is shown in FIG. 2. The commutating gate is again identified by reference numeral 11, the monostable device is identified by reference numeral 15, and the bistable device is identified by reference number 18. The write input data occurs on conductor C, this corresponding to conductor 10 of FIG. 1. The output occurs on conductor L, this corresponding to conductor 19 of FIG. 1. The commutating feedback 23 of FIG. 1 is identified as conductors 70 and 71 of FIG. 2.

The NAND gate utilized in this structure is functionally equivalent to an AND gate which is followed by an inverting element. Both structures provide a coincidence function since the output when all inputs are present is uniquely different than other possible outputs.

Referring to the commutating gate of FIG. 2, this commutating gate includes a signal inverter 72, a first NAND circuit 73 and a second NAND circuit 74. The inputs 75 and 76 of the respective gates 73 and 74 are connected to conductor B which receives a "write NRZI" signal, this signal having the effect of enabling these gates when the data on conductor C is NRZI data, and to inhibit these gates when the data on conductor C is PE data. Input 77 of gate 73 receives the input data from conductor C, whereas input 78 of gate 74 receives the complement of this input data, which complement appears at the output of inverter 72 on conductor D. Input 79 of gate 73 receives the commutating feedback on conductor 71, this conductor being connected to terminal K and receiving the complement of the delayed output data which is present on conductor L, as will be apparent. The third input 80 of gate 74 is connected to the commutating feedback on conductor 70 and receives the output data present on conductor L.

The input of monostable device 15 is connected to the outputs of NAND gates 73 and 74, the output of these respective gates being present on conductors E and F. The output of monostable device 15 is present on conductor G and connects to the input of a differentiator 81, this differentiator being constructed and arranged to be sensitive only to the negative-going transition of the output pulse of monostable device 15. Coincident with the occurrence of this negative-going transition, differentiator 81 produces an output signal on conductor H, which conductor is connected to the inputs 83 and 84, respectively, of third and fourth NAND gates 85 and 86. The second input 87 of NAND gate 85 receives the complement of the input data present on conductor C, while the second input 88 of NAND gate 86 receives this data directly from conductor C.

The outputs of NAND gates 85 and 86 respectively occur on conductors I and J and form one input to fifth and sixth NAND gates 89 and 90, respectively. NAND gates 89 and 90 are connected to form a latch means, since the output of NAND gate 90, existing on conductor L, forms an input 91 to NAND gate 89, and the output of NAND gate 89, existing at terminal K forms an input 92 to NAND gate 90. An input 93 to NAND gate 90 is connected to conductor A to receive a reset voltage, placing latch 89, 90 in step, as will be apparent.

The structure of FIG. 2 is constructed to accommodate NRZI or PE data. Seventh NAND gate 94 has one input 95 connected to receive the complement of data present on conductor C and has a second input 96 connected to conductor M to receive a "write PE" signal which is the complement of the "write NRZI" signal applied to conductor B. This "write Pe" signal has the effect of enabling NAND gate 94 in the presence of PE data on conductor C, and has the effect of inhibiting gate 94 when NRZI data is present on conductor C.

Figure 3:
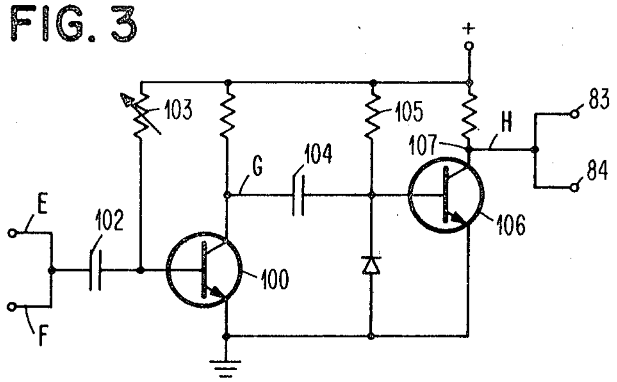
FIG. 3 is a showing of the monostable device and the differentiation of FIG. 2.

An example of specific structure which may be used to provide the monostable and differentiator functions of elements 15 and 81 of FIG. 2, is disclosed in FIG. 3. The monostable device includes transistor 100, wherein the stable state is with transistor 100 conductive. The occurrence of a negative transition at either conductor E or F causes transistor 100 to become nonconductive for a time period determined by the time constant of capacitor 102 and variable resistor 103. Resistor 103 is manually adjustable to produce a desired time delay, this being the timing period *t3* referred to in connection with FIG. 1. The output of the monostable device occurs at conductor G and is applied to the differentiating circuit including capacitor 104 and resistor 105. Transistor 106 responds to the negative-going transition of the monostable device output pulse present on conductor G to become nonconductive for a short time period, causing terminal 107 and conductors 83 and 84 to produce a positive output pulse in time coincidence with this negative-going transition.

Figure 4:
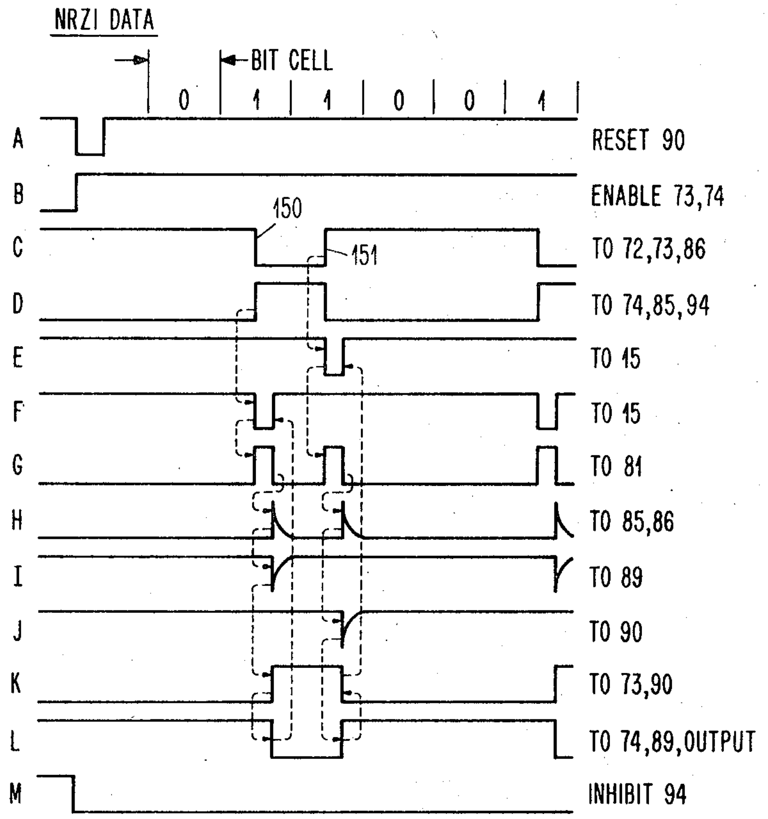
FIG. 4 shows the relationship between a pattern of NRZ data, specifically NRZI, and the operation of the various circuit elements of FIG. 2.

Referring to FIG. 4, this figure shows the relationship between a pattern of NRZI data on conductor C and the operation of the various circuit elements to produce the waveforms on conductors D through L, as shown in FIG. 4.

For the mode of operation assumed in connection with FIG. 4, with NRZI data present on conductor C, conductor B is conditioned to enable NAND gates 73 and 74, and the signal on conductor M inhibits NAND gate 94. Waveform C has been arbitrarily selected to represent the data pattern 0, 1, 1, 0, 0, 1. In the NRZI method of encoding, such a data pattern results in a negative-going transition 150, followed one bit cell later by a positive-going transition 151, this transition being followed three bit cells later by a negative-going transition 152. The reset input wave form on conductor A has conditioned the latch means, consisting of NAND gates 89 and 90, such that the commutating feedback, conductors 70 and 71, has enabled NAND gate 74 and inhibited NAND gate 73.

The complement of the first transition 150 of NRZI input on conductor C is applied as an input to NAND gates 74, 85, and 94. Since NAND gate 94 is inhibited, this input has no effect. However, the input to NAND gate 74 produces a negative-going transition on conductor F. This, in turn, causes monostable device 15 to switch from its stable condition of operation to its unstable condition of operation, to produce a positive-going transition on conductor G. A short time thereafter, namely the timing period *t3* of monostable device 15, waveform G provides a negative-going transition is sensed by differentiator 81 to produce waveform H, providing an input to NAND gates 85 and 86. Only gate 85 is enabled at this time, by virtue of the complement of the input signal present on conductor D. Thus, waveform I appears at the output put of NAND gate 85, and this waveform is effective through NAND gate 89 to generate a positive-going transition in waveform K at terminal K. This positive-going transition is applied to input 92 of NAND gate 90 and causes a negative-going transition to appear at output conductor L. This negative-going transition at conductor L is applied as a commutating feedback, by way of conductor 70, to input 80 of NAND gate 74, causing a positive-going transition on conductor F.

Thus, it can be seen that negative-going transition 150 of waveform C appears on conductor L as negative-going transition 153 and has been delayed by the timing period of monostable device 15.

Considering the positive-going transition 151 of NRZI input data, as shown in waveform C, this positive-going transition is applied as an input to NAND gates 73 and 86. The complement of the output signal now present at terminal K enables NAND gate 73, and the positive-going transition 151 produces a negative-going transition on conductor E. This negative-going transition again causes operation of monostable device 15 and differentiator 81 to produce a positive-going pulse on conductor H. However, in this instance, NAND gate 86 is enabled by input 88 and waveform H is effective to generate a negative-going pulse on conductor J. This negative-going pulse causes a positive-going pulse at output conductor L, this positive-going pulse being applied to NAND gates 74 and 89. NAND gate 89 thus produces a negative-going voltage at terminal K, which, in turn, is applied as a commutating feedback, by way of conductor 71, to input 79 of NAND gate 73, causing a positive-going transition on conductor E.

Figure 5:
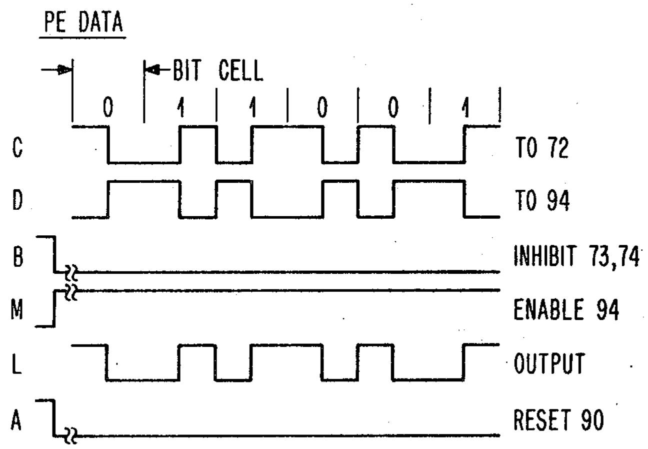
FIG. 5 shows the relationship between phase encoded (PE) data and the operation of the various circuit elements of FIG. 2.

Considering the use of the structure of FIG. 2, wherein phase encoded data is applied to conductor C, FIG. 5 discloses waveforms C, D, B, M and L corresponding to like conductors of FIG. 2. Waveform B inhibits NAND gates 73 and 74, whereas waveform M enables NAND gate 94, allowing the complement of the data on conductor C to pass through NAND gate 94, causing the waveform L to appear on conductor L. By way of a typical example, a typical recording condition for NRZI data may involve movement of tape 57 of FIG. 6 at 100 inches per second, with a recording density of 800 bits per inch, this corresponding to 800 flux changes per inch, wherein the bit cell width will be 12.5 microsecond time period. With such a typical recording condition, the range of adjustment of monostable device 15, to produce the timing period *t*3, is continuously variable, as by adjustment of resistor 103 of FIG. 3, up to a maximum of 3 microseconds. A further typical example of static head gap scatter, this being a function of the mechanical construction of the multi-gap head, is such that at the tape speed of 100 inches per second, the maximum head gap scatter to be experienced between the two gaps spaced by the greatest distance is 3 microseconds.

While the invention has been particularly shown and described with reference to a preferred embodiment thereof, it will be understood by those skilled in the art that various changes in form and details may be made therein without departing from the spirit and scope of the invention.

What is claimed is:

1. A plurality of write circuits for use in conjunction with a multi-gap magnetic recording head to write digital data on a moving magnetic surface, each of said write circuits comprising:

commutating gate means having a signal input adapted to receive an electrical write signal in accordance with the data to be written by its respective head gap, and having a commutating input;

a monostable device having an input connected to the output of said gates means, said monostable device having a timing period which is less than the shortest interval to be experienced between adjacent electrical transitions of the write signal, such that the output of said monostable device consists of two electrical transitions for each transition of the write signal;

a polarity sensitive bistable means having an input connected to the output of said monostable device, said bistable means being constructed and arranged to be responsive to the second transition of the output of said monostable device; and means connecting the output of said bistable means to the commutating input of said gate means.

2. The circuit defined in claim 1, wherein the monostable device is responsive to a given polarity input, and wherein said gate means commutates the write signal to produce a transition of said given polarity for each transition of said write signal.

3. The circuit defined in claim 1, adapted for use in the selective writing of phase encoded or non-return-to-zero encoded digital data, and including further gate means having an input adapted to receive the electrical write signal, means to inhibit said commutating gate means in the presence of phase encoded data, and means to inhibit said further gate means in the presence of non-return-to-zero data.

4. The circuit defined in claim 1, wherein said commutating gate means includes a first and a second coincidence gate, said first coincidence gate receiving as inputs the electrical write signal and the complement of the output of said bistable means, and said second coincidence gate receiving as inputs the complement of the electrical write signal and the output of said bistable means.

5. The circuit defined in claim 4, wherein said bistable means includes, a polarity sensitive differentiating circuit, and third and fourth coincidence gates; the input of said differentiating circuit being connected to the output of said monostable device, said third coincidence gate receiving as inputs the output of said differentiating circuit and the complement of the electrical write signal, said fourth coincidence gate receiving as inputs the output of said differentiating circuit and the electrical write signal; and latch means responsive to the outputs of said third and fourth coincidence gates.

6. The write circuit defined in claim 5, wherein said latch means includes fifth and sixth coincidence gates, said fifth coincidence gate receiving as inputs the output of said third coincidence gate and the output of said sixth coincidence gate, and said sixth coincidence gate receiving as inputs the output of said fourth coincidence gate and the output of said fifth coincidence gate, the outputs of said fifth and sixth coincidence gates constituting the complement of the output signal of said bistable means and the output signal of said bistable means, respectively.

7. A delay circuit for use in delaying a digital data signal having electrical transitions between two signal levels, the electrical transitions occurring at variable time intervals equal to or greater than a given minimum interval, the delay circuit comprising:

commutating gate means having a signal input adapted to receive the data signal, and having a commutating input adapted to receive a signal which causes said commutating gate means to produce an output electrical transition of a given polarity in time coincidence with each electrical transition of the data signal;

a monostable device connected to the output of said commutating gate means and responsive to an electrical transition of said given polarity to produce an output pulse, the time interval of said output pulse being less than the given minimum interval of the data signal;

polarity sensitive bistable means having an input connected to the output of said monostable device and responsive only to the trailing edge of the output pulse of said monostable device; and means connecting the output of said bistable means to the commutating input of said commutating gate, whereby the output of said bistable means constitutes a delayed reproduction of the data signal which is delayed by the time interval of the output pulse of said monostable device.

8. A write circuit for use in multiple track magnetic recording of transversely adjacent cells of digital data, said circuit being responsive to electrical input signals and effective to produce electrical transition occurrences which are time delayed in a predetermined manner in accordance with the spacial gap scatter of an associated magnetic recording head, comprising:

a plurality of input commutating gate means, one for each of the tracks, each gate means having a commutating input and a signal input adapted to receive an electrical write input signal for one of the tracks, each of the plurality of write signals having electrical transition occurring at variable time spacings in accordance with the data to be recorded in its track, and the write signals normally providing a number of electrical transitions which are in time coincidence within a given cell;

a plurality of monostable devices, one for each of the tracks, each of which is connected to be controlled by one of said gate means, and each having a timing period which is less than the shortest interval to be experienced between adjacent electrical transitions of its write signal, such that each of said monostable devices is operable in response to an electrical transition of its write signal to produce an output pulse of said timing period duration;

a plurality of polarity sensitive bistable means, one for each of said tracks, each of which is connected to be controlled by one of said monostable devices and is responsive only to the trailing edge of an output pulse from its monostable device to change from one stable state to the other; and means connecting the output of each of said bistable means to the commutating input of its gate means to enable said gate means to pass the subsequent electrical transition of its write signal to its monostable device.

* * * * *

930-4008-00D
PO-1050
(5/69)

UNITED STATES PATENT OFFICE
CERTIFICATE OF CORRECTION

Patent No. 3,653,061 Dated March 28, 1972

Inventor(s) Lewis S. Frauenfelder and Judson A. McDowell

It is certified that error appears in the above-identified patent and that said Letters Patent are hereby corrected as shown below:

Add Claim 9.

--9. A write circuit as defined in Claim 8, including means associated with said monostable device to independently vary the timing period of each monostable device, and including means adapted to connect the output of each of said bistable means to energize one of the gaps of the magnetic recording head.--

Signed and sealed this 8th day of August 1972.

(SEAL)
Attest:

EDWARD M.FLETCHER,JR.
Attesting Officer

ROBERT GOTTSCHALK
Commissioner of Patents